US008209608B1

(12) United States Patent
Linyard et al.

(10) Patent No.: US 8,209,608 B1
(45) Date of Patent: Jun. 26, 2012

(54) METHOD AND SYSTEM FOR PRESENTING STRUCTURED INFORMATION IN AN INTERACTIVE MULTIMEDIA ENVIRONMENT

(75) Inventors: Ronald A Linyard, San Diego, CA (US); Mark Wineman, San Diego, CA (US); Erik Digre, San Diego, CA (US); Theodore G. Palmer, San Diego, CA (US); Yunsheng Zhao, San Diego, CA (US)

(73) Assignee: Adobe Systems Incorporated, San Jose, CA (US)

( * ) Notice: Subject to any disclaimer, the term of this patent is extended or adjusted under 35 U.S.C. 154(b) by 964 days.

(21) Appl. No.: 10/789,475

(22) Filed: Feb. 27, 2004

Related U.S. Application Data

(60) Provisional application No. 60/471,142, filed on May 16, 2003.

(51) Int. Cl.
*G06F 3/00* (2006.01)
(52) U.S. Cl. ........ 715/716; 715/705; 715/712; 715/713; 715/714
(58) Field of Classification Search .................. 715/705, 715/712, 713, 714, 716
See application file for complete search history.

(56) References Cited

U.S. PATENT DOCUMENTS

| | | | |
|---|---|---|---|
| 5,933,140 A | | 8/1999 | Strahorn et al. |
| 6,133,917 A | | 10/2000 | Feigner et al. |
| 6,300,950 B1 | | 10/2001 | Clark et al. |
| 6,353,448 B1 * | | 3/2002 | Scarborough et al. ........ 715/744 |
| 2001/0029527 A1 * | | 10/2001 | Goshen .......................... 709/218 |
| 2002/0091725 A1 | | 7/2002 | Skok |
| 2002/0118221 A1 | | 8/2002 | Hudson et al. |
| 2002/0133404 A1 * | | 9/2002 | Pedersen .......................... 705/14 |
| 2002/0138624 A1 * | | 9/2002 | Esenther ........................ 709/227 |
| 2002/0147757 A1 | | 10/2002 | Day et al. |
| 2002/0152267 A1 * | | 10/2002 | Lennon ......................... 709/203 |

(Continued)

OTHER PUBLICATIONS

Jesse Jin and Ruiyi Wang The development of an online video browsing system ACM International Conference Proceeding Series vol. 147 Published 2001.*

(Continued)

*Primary Examiner* — Adam M Queler
*Assistant Examiner* — Andrea Long
(74) *Attorney, Agent, or Firm* — Robert C. Kowert; Meyertons, Hood, Kivlin, Kowert & Goetzel, P.C.

(57) ABSTRACT

The present invention provides an interactive multimedia system for providing structured information systems, for example help systems for desktop and network based applications. The invention employs an interactive multimedia runtime container and rich media content and other data files for the structured system navigational components such as the Table of Contents (TOC), Index, Search, and Glossary. In another aspect, the invention provides a structured navigation interface through the use of rich media files driven by data files which allow the user or the author to create a customized appearance for the structured information system. The system is advantageously cross-browser and cross-platform compatible and ensures consistent navigation and look and feel across platforms and browsers. The system additionally provides compatibility with high security networks and firewall systems, allows authors to focus on content without concern over platform and browser compatibility issues, and brings powerful, appealing new visual options to authors.

20 Claims, 14 Drawing Sheets

U.S. PATENT DOCUMENTS

| | | | | |
|---|---|---|---|---|
| 2002/0154155 | A1* | 10/2002 | McKirchy | 345/705 |
| 2003/0004923 | A1 | 1/2003 | Real et al. | |
| 2003/0163784 | A1* | 8/2003 | Daniel et al. | 715/514 |
| 2003/0211447 | A1* | 11/2003 | Diesel et al. | 434/118 |
| 2004/0031058 | A1* | 2/2004 | Reisman | 725/112 |
| 2004/0255057 | A1 | 12/2004 | Opheim et al. | |
| 2005/0010871 | A1* | 1/2005 | Ruthfield et al. | 715/712 |
| 2005/0091596 | A1* | 4/2005 | Anthony et al. | 715/712 |

OTHER PUBLICATIONS

David Becker Macromedia frees Flash from the browser ZDNet News Mar. 26, 2003.*

J. Rice, A. Farquhar, P. Piernot, & T. Gruber; "Lessons Learned Using the Web as an Application Interface"; Proceedings of CH196; Vancouver, British Columbia; Apr. 1996.*

* cited by examiner

METHOD AND SYSTEM FOR PRESENTING STRUCTURED INFORMATION IN AN INTERACTIVE MULTIMEDIA ENVIRONMENT

RELATED APPLICATION

The present application claims the benefit of U.S. provisional patent application Ser. No. 60/471,142 filed on May 16, 2003, which is incorporated herein by reference in its entirety.

BACKGROUND

1. Field of the Invention

The present invention relates generally to structured information systems and, more particularly, to help systems for desktop and network based software applications.

2. Related Art

In the early days of computing, little thought was given to online user assistance, or help systems. Developers and users of the era were technically proficient and expected software to perform a business function. If they needed assistance on how to perform a task, they did not expect to get that assistance from the software itself, but from items such as "Read Me" files. Read Me files were simple text documents with basic instructions. These Read Me files were installed with the application, but accessed externally from the application.

As DOS applications evolved and became more complex, the Read Me files grew rapidly in size. The increased complexity of the applications required more instructions. The Read Me file reached a point where it became so large, it was very difficult to locate specific information. This led software manufacturers to attempt to develop online forms of information to make instructions available from within the application itself. Even DOS itself had a "Help" command in an attempt to assist users with text information.

The early attempts to provide software users with electronic information were well intentioned, but quickly created a confusing state where every software vendor implemented their help information in a different way. This forced software users to memorize various methods to gain access to this information depending on what application they were currently using. The end result was that much of this built-in assistance went unused.

As DOS computing evolved into Windows computing, Microsoft standardized the concept of online user assistance, and the modern concept of help systems was born. This early format, called WinHelp, standardized the methods for displaying information and the techniques for connecting that information to the software application. For the first time, software users could access helpful information in the same way no matter who the vendor of the software was. With the release of Windows 98, Microsoft released the HTML Help format to replace the aging WinHelp technology. HTML Help, despite its age, is the current format recommended by Microsoft for Windows desktop applications.

The formats mentioned above, WinHelp and HTML Help, were both created by Microsoft and are proprietary to the Microsoft Windows operating system. Neither of these formats supports software applications on other platforms such as Macintosh or Linux. They are also designed to support desktop software applications, and not the current web or web/desktop hybrid applications. Attempting to use Microsoft's HTML Help from a web server results in security warning dialogs and significant download delays. Other existing help formats, which have some cross-platform support, have issues in several areas: formats which use Java technology for navigation exhibit security issues with high security Firewalls, and those which use DHTML exhibit unwelcome visual differences across platforms and browsers.

From its humble beginnings as a network to share documents, the Internet has exploded as a tool for conducting business, sharing information, and streaming data. The software applications once tied to the PC desktop are now appearing on the Internet as network based applications. Early network based applications, like their early DOS counterparts, were very basic. Typically created from standard HTML, JavaScript, and form elements, these first attempts at providing software applications in a browser environment were rudimentary, yet mostly successful.

Documentation for these early network based applications was just as necessary as for the desktop applications that preceded them. The Frequently Asked Questions (FAQ) page, the modern equivalent to the Read Me file, was born. As the complexity of network based applications continued to increase, the size of the FAQ pages also increased. The FAQ page was reaching the same limitations that the Read Me file had suffered from during the evolution of desktop applications.

Just as desktop applications rapidly outgrew the Read Me file, the complexity of web-applications has outpaced the ability of the FAQ page to keep up. New feature-rich web applications require the same robust forms of user-assistance that people have come to expect from the desktop. However, authors attempting to create help systems for web applications have run up against many of the same issues as desktop help authors: help formats which use Java technology for navigation exhibit security issues with high security Firewalls, and those which use DHTML exhibit unwelcome visual differences across platforms and browsers. Additionally, they were unable to make the help system as visually appealing as their web application.

Therefore, the industry has created a need for a structured information system with the power of a desktop application that is cross-browser and cross-platform compatible and capable of implementation over a network or as a stand-alone application.

SUMMARY

The present invention provides an interactive multimedia application environment for providing a structured information system. In one aspect, the invention uses a multimedia runtime container and data files to provide navigational components of the structure information system. For example, navigation components may include a Table of Contents ("TOC"), Index, Search, and Glossary. In a particular embodiment, the TOC, Index, Search, and Glossary content is defined by XML files with rich media files used for the visual presentation of this XML content. Of course, the teachings of the invention are not limited to using XML data files for content. The system is advantageously cross-browser and cross-platform compatible and ensures consistent navigation and look and feel across platforms and browsers. Because it does not rely on Java applets, it provides compatibility with high security or firewall systems. It empowers structured information system authors to focus on content and not worry about platform and browser compatibility issues.

In another aspect, the invention recreates a structured navigation interface through the use of rich media files driven by data files which allow the user or the author to create a customized appearance, or Skin, for the help system. This functionality advantageously allows authors to create visually appealing structured information system interfaces. For example, icons and buttons can be animated, static, or even interactive, allowing authors to create rich media structured information systems that keep pace with today's dynamic applications.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

The present invention relates to structured information systems including those generally created as and for desktop and network based software applications including, for example, help systems. In the exemplary embodiment, applications of the invention are described with respect to a help system. However, it should be understood that the teachings of the invention are not limited to this exemplary embodiment, and may be applied to other stand-alone, distributed, and network based structured information systems including, for example, Policy Guides, Procedure Guides, User Guides, and Employee Handbooks, just to name a few. As such, this detailed description should not be construed to limit the scope or breadth of the present invention as set forth in the appended claims.

Figure 1:
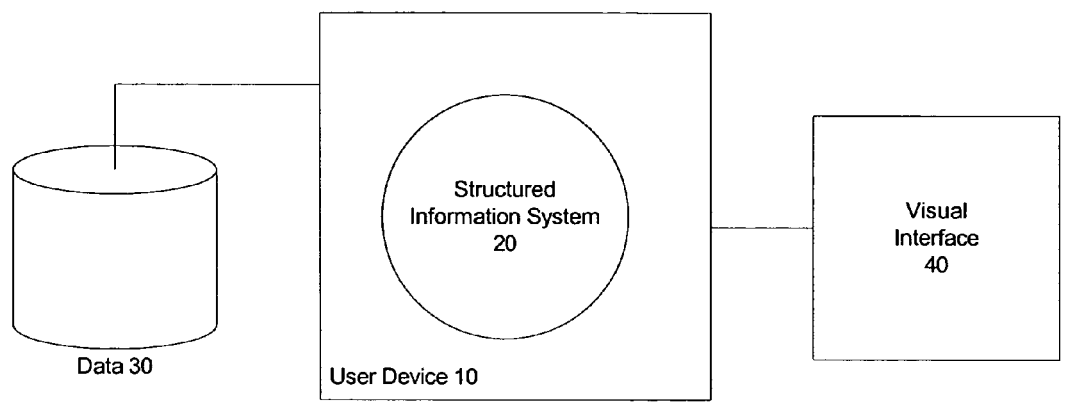
FIG. 1 is a block diagram illustrating an example user device for providing a structured information system according to an embodiment of the invention.

FIG. 1 is a block diagram illustrating an example user device 10 for providing a structured information system 20 according to an embodiment of the invention. In the illustrated embodiment, the user device 10 includes a visual interface 40, which is capable of displaying a structured information system 20, and a data storage device 30, which is capable of storing and retrieving the data required to implement a structured information system 20.

In the exemplary embodiment, the user device 10 can be a standard personal computer ("PC") and the data storage device 30 can be a typical fixed or removable computer storage device or network storage device. In alternative embodiments, the user device 10 may also be implemented as a personal digital assistant ("PDA"), laptop, wireless communication device (e.g., providing remote audio, video, and text services), or any other computing device with the ability to provide structured information to a user. Other computer systems and/or architectures may also be used, as will be clear to those skilled in the art.

Figure 2:
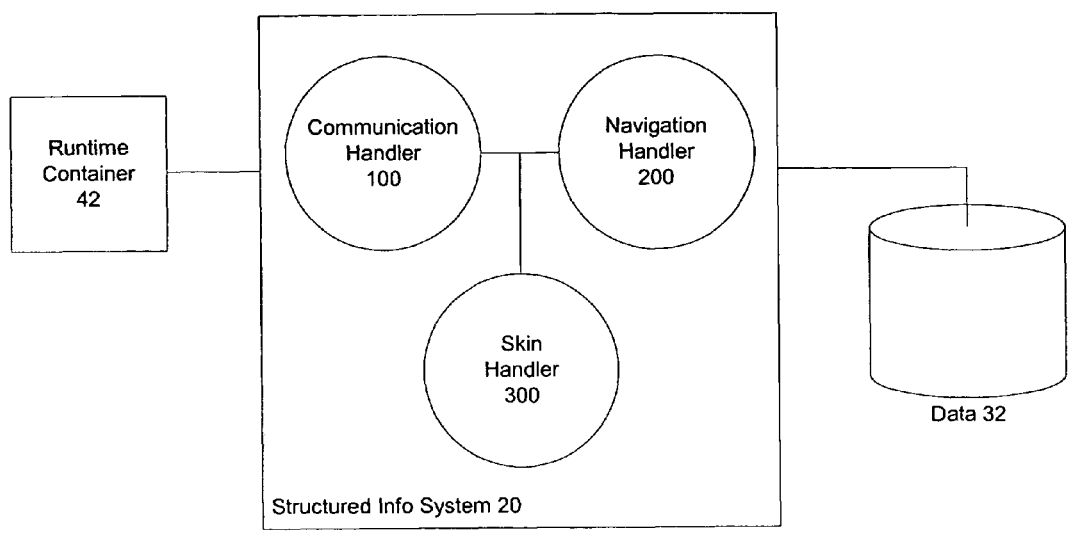
FIG. 2 is a block diagram illustrating an example structured information system according to an embodiment of the invention.

Turning now to FIG. 2, a block diagram illustrating an example structured information system 20 according to an embodiment of the invention is shown. This figure drills into the three (3) main modules of the invention: the Communication Handler 100, the Navigation Handler 200, and the Skin Handler 300. In addition, this diagram describes the link between a runtime container 42 and data storage device 32. The Communication Handler 100 is responsible for routing and interpretation of commands in the system. The system as a whole comprising the structured information system 20, the runtime container 42, and the associated storage device 32 is referred to as the runtime system.

The Navigation Handler 200 is responsible for the loading, interpretation, manipulation and display of structured navigation information.

The Skin Handler 300 is responsible for loading information from data files, containing information about the visual structure of the runtime system. Such information can preferably be stored in a data storage area such as data storage area 32. This data may include localization and internationalization information as well as information about specific aspects of the individual components that make up the runtime system.

Figure 4:
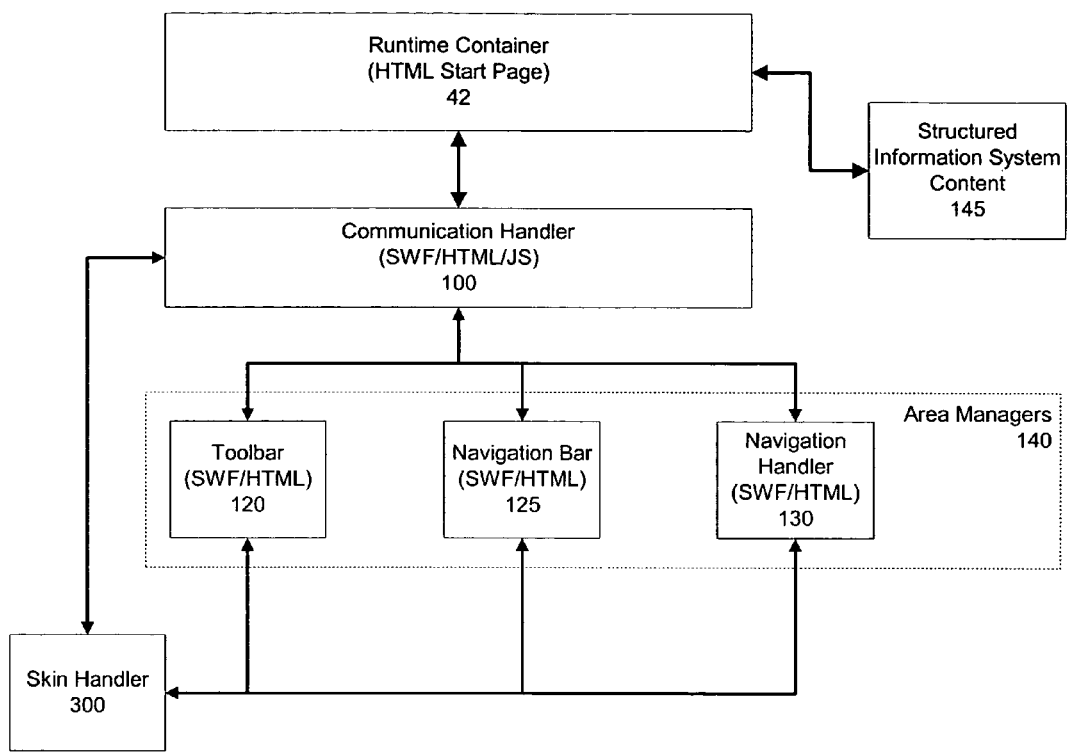
FIG. 4 is a block diagram illustrating an example communication flow in a structured information system according to an embodiment of the invention.

In one embodiment, the runtime container 42 may be implemented as a standard Web browser. It is the responsibility of the runtime container 42 to allocate screen space to the different Area Managers 140 (FIG. 4). In one embodiment, the Area Managers 140 (FIG. 4) include the Toolbar 120 (FIG. 4), Navigation Bar 125 (FIG. 4), and Navigation Handler 130 (FIG. 4). The runtime container 42 may also be implemented as a software solution, a hardware device, or a combination of hardware and software that is capable of displaying interactive multimedia, rich media, and/or HTML content.

Figure 3:
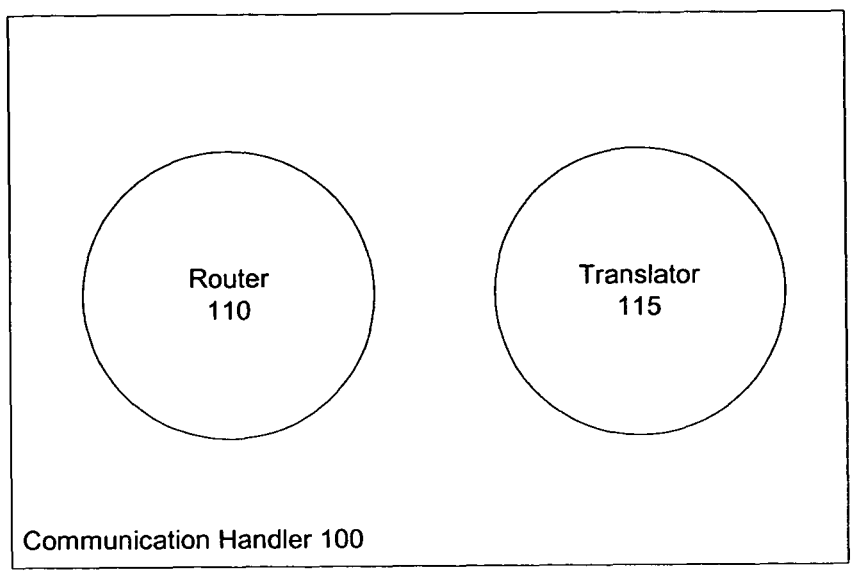
FIG. 3 is a block diagram illustrating an example Communication Handler according to an embodiment of the invention.

Turning now to FIG. 3, a block diagram illustrating an example Communication Handler 100 according to an embodiment of the invention is shown. In the illustrated embodiment, the Communication Handler 100 comprises a Router 110, and a Translator 115.

The Router 110 knows about all Area Managers 140 (FIG. 4) and how to communicate with them. Because several different structured information systems may be viewed simultaneously on a single computing device, it is possible that multiple instances of each Area Manager could be running simultaneously. A common way for interactive multimedia movies to communicate is using a named bi-directional or uni-directional pathway from one interactive multimedia movie to another. In an embodiment implemented using Flash, the communication between interactive multimedia movies can be created using a named LocalConnection. In an alternative embodiment, the communication pathway can be implemented using a named pipe.

For example, in FIG. 4, the communication pathway from the Toolbar 120 to the Communication Handler 100 has a name. That name is a system-wide identifier for the communication path. If multiple instances of an Area Manager (e.g., the Toolbar 120) are running concurrently using the same communication pathway name, unpredictable results may occur. Accordingly, unique communication pathway names are constructed when each instance of a Communication Handler 100, Area Manager 140, and Skin Handler 300 is created. The unique name can be constructed, for example, using the system clock on the computing device to ensure uniqueness.

The Router 110 also knows about the Skin Handler 300 (FIG. 5) and how to communicate with it. The Skin Handler 300 reads in information from the Skin Data File (FIG. 6) that describes the composition of the various Area Managers. This information is passed to the Communication Handler 100, where it is used by the Router 110 to facilitate communication flow between the various components of the runtime system.

The Translator 115 is responsible for interpreting the commands that are sent through the system. Some commands are simply passed through while others are translated into one or more additional commands. After interpreting commands, the Translator 115 uses the Router 110 to distribute the commands to the appropriate Area Managers 140 (FIG. 4). Knowledge about which commands are translated and which commands are passed through resides in the Translator 115. In addition, it is not necessary that every command get routed to every Area Manager or the Runtime Container. In one embodiment, the Translator 115 has hard coded knowledge about which commands are appropriately routed to which Area Managers. In another embodiment, the Translator 115 uses an external data file for knowledge about which commands are appropriately routed to which Area Managers. In yet another embodiment, the Area Managers register themselves with the Translator 115 and identify which commands they handle.

In addition to the communication functions described, the Communication Handler 100 may also be responsible for storing state information for the components in the system. This is particularly useful when a component in the system is reloaded, for example, a dynamic reload after a frame is resized or a reload due to memory management steps carried out by the Runtime Container 42.

In one embodiment, components in the system (such as the Data Type Viewers 222 in FIG. 10) send a message to the communication handler containing their current state. The information could include but is not limited to which portions of the data is currently visible and the current state of the items. The Communication Handler 100 stores that information until the component requests it at which time the Communication Handler 100 transmits the information back.

Turning now to FIG. 4, a block diagram illustrating an example communication flow in a structured information system according to an embodiment of the invention is shown. At the core of the system architecture is the Communication Handler 100. The Communication Handler 100 is a rich media file. In one embodiment, there may also be HTML and browser script helper files, which facilitates communication with the runtime container 42. In general, the Communication Handler 100 is responsible for communicating between the runtime container, the Area Managers 140, and the Skin Handler 300. These modules handle all aspects of navigation within the structured information system and the visual presentation of the user interface for the runtime system.

The Runtime Container 42, for example a Web browser and a set of HTML and JavaScript files, is responsible for providing the user interface for the structured information system. The Runtime Container 42 is responsible for placing the different aspects of the structured information system within its window and communicating information between the structured information system's content window 148 (FIG. 13) and the rest of the structured information system. The Runtime Container 42 communicates to the structured information system through the Communication Handler 100. In one embodiment, the Runtime Container 42 is a web browser, and it communicates with the interactive rich media based Communication Handler 100 using known communication protocols. However, because there are implementation differences between web browsers used for viewing the structured information systems, the system includes a hidden HTML frame used to handle the communication from the Runtime Container 42 to the Communication Handler 100. Each time a command is sent from the Runtime Container 42 to the Communication Handler 100, the hidden HTML frame is automatically reloaded and upon loading, the hidden frame fetches information from the Runtime Container 42 about the command to pass to the Communication Handler 100. The hidden HTML frame then creates a generally known communication pathway to the Communication Handler 100 and transmits the command and accompanying data. In addition, the Communication Handler 100 communicates information to the Runtime Container 42 using standard communication protocols.

Figure 5:
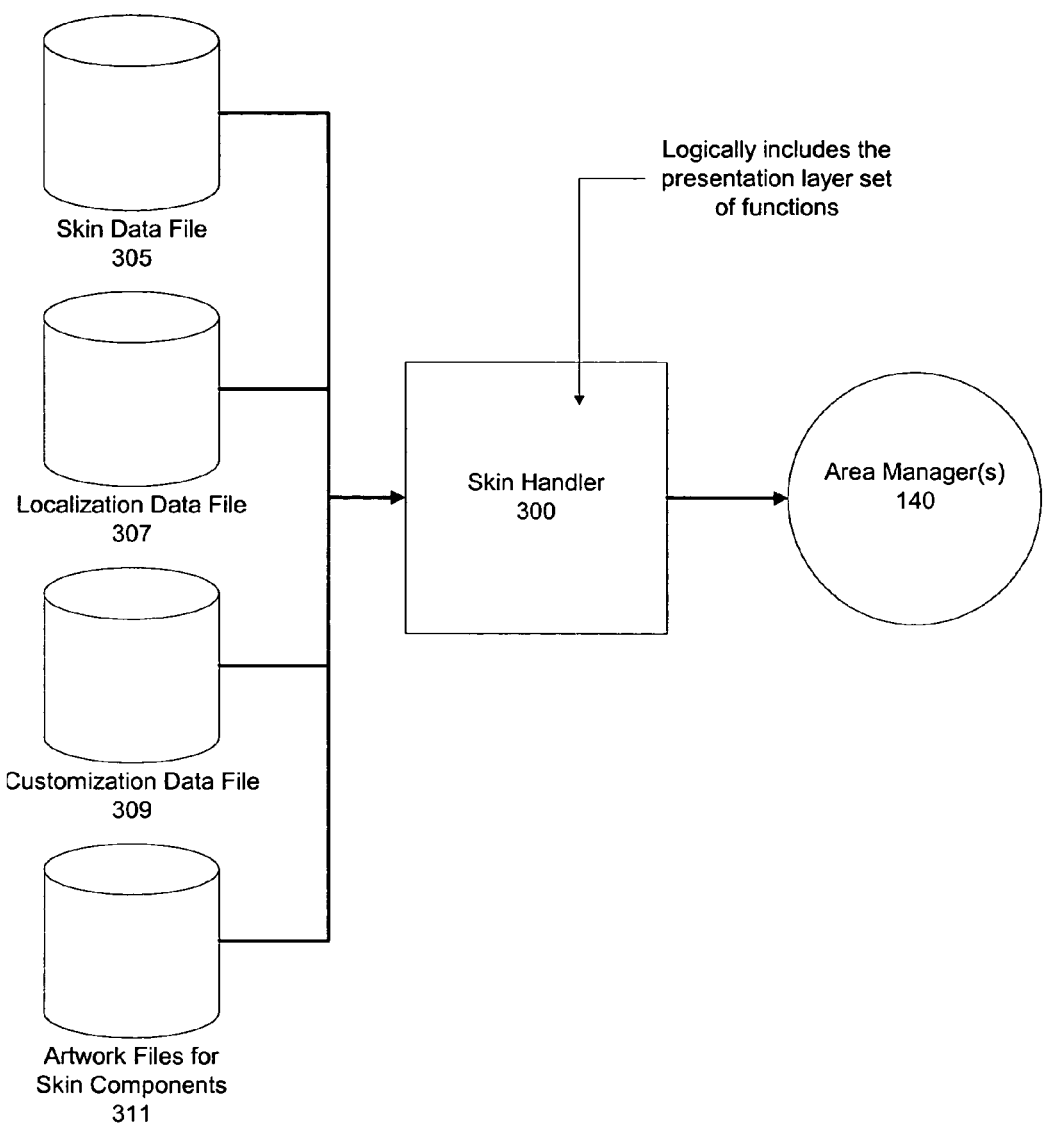
FIG. 5 is a block diagram illustrating an example Skin Handler according to an embodiment of the invention.

There is an interactive multimedia Skin Handler 300 that is responsible for reading information from the Data Files 305, 307 and 309 (FIG. 5). In one embodiment, these files are XML, although other formats may also be employed, as will be understood by one having skill in the art. The Data Files 305, 307 and 309 (FIG. 5) when used in conjunction with the rich media files that contain the artwork for a Skin 311 (FIG. 5), completely define the look of the runtime system. In one embodiment, standard rich media or XML reading capabilities can be used to load information from the files.

The Skin Handler 300 communicates with the runtime system through two main pathways. The first is through the Communication Handler 100 and the second is a pathway directly with each of the Area Managers 140. The pathway to the Communication Handler 100 is used by the runtime system to define the general aspects of the various Area Managers 140. In one embodiment, the communication pathways between the Skin Handler 300 and the Communication Handler 100 are established using the same unique identifier mechanism described elsewhere. Similarly, the communication pathways between the Skin Handler 300 and the Area Managers 140 can employ the same mechanism. In one embodiment, this may include information regarding the number of Area Managers 140 and how they should be positioned in the runtime system. The second pathway, which comprises discrete pathways to each Area Manager 140, is used by the runtime system to define the various components that comprise the navigational and graphical aspects of each Area Manager 140. In one embodiment, this may include the individual rich media files that comprise the individual Area Managers 140.

The Toolbar 120 receives information from the Skin Handler 300 and uses this data along with the rich media files containing the artwork for the Toolbar 120 to construct and graphically display the Toolbar 120 in the runtime container 42. The information passed from the Skin Handler 300 to the Toolbar 120 may include the item (buttons, etc.) to display on the toolbar, the item sizes and locations, the background artwork for the toolbar, and textual information including localization data. Each item on the Toolbar 120 may be one or more interactive multimedia movies.

The Navigation Bar 125 also receives information from the Skin Handler 300 and uses this information in conjunction with certain rich media files containing the artwork for the Navigation Bar 125 to graphically display the Navigation Bar in the Runtime Container 42. The information passed to the Navigation Bar 125 from the Skin Handler 300 is similar to the information for the Toolbar 120.

The Navigation Handler 130 is responsible for displaying the different navigation paradigms in the Runtime Container 42. In one embodiment, these navigation paradigms, or navigation components, include the "traditional" navigation paradigms of a structured information system, such as the table of contents, index, search and glossary. The Navigation Handler 130 has the further responsibility of facilitating communication between the various navigation components and the Communication Handler 100, which in turn communicates to the rest of the runtime system.

Turning now to FIG. 5, a block diagram illustrating an example Skin Handler according to an embodiment of the invention is presented. The Skin Handler 300 is responsible for the appearance of the runtime system.

The Skin Handler 300 comprises a set of functions in the system that combines information from the Skin Data File 305, Customization Data File 309, Localization Data File 307, and the rich media files 311 resulting in the way the runtime system looks as displayed by the Area Managers 140 in the runtime container. The information from the Skin Data File 305, the Localization Data File 307, and the Customization Data File 309 are passed to the Area Managers 140 and their components by the Skin Handler 300. In one embodiment, the look of the runtime system is constructed using a hierarchy of information from the data files 305, 307, 309 and 311. The base information is stored in the rich media files 311. Data in the Skin Data File 305 further defines and overrides the basic information in the rich media files 311. In addition, the Customization Data File 309 can contain information that overrides or enhances the information in the Skin Data File 305. For example, the Skin Data File 305 might define the background artwork for the Toolbar 120, and the Customization Data File 309 could override that background information. Finally, the Localization Data File 307 can override text strings in the Skin Data File 305 and Customization Data File 309.

In one embodiment, the underlying file structure of these data files is XML. It should be noted that any other file structure can be used for this purpose.

The Skin Data File 305 contains the detailed information about what the runtime system looks like.

The Localization Data File 307 contains the text that appears in the runtime system for items that contain localization capability. That information includes, for example, labels for buttons, labels for input fields, and text displayed on information and error screens just to name a few.

The Customization Data File 309 contains information about how to change the values in the Skin Data File 305 and rich media files 311 to alter the appearance of the items at runtime. For example, if the color red is used as the 'base' color of items in the toolbar 120 (FIG. 4), it is possible to specify the base color as blue in the Customization Data File 309 to override the values in the Skin Data File 305 and the runtime rich media file. Each rich media file in the system defines which values it uses to customize its appearance, and each rich media file can use an unlimited number of such values. There is a corresponding section in each Skin Data File 305 and Customization Data File 309 for each rich media file with definitions for each of the customization values.

The rich media files for skin components 311 contain the artwork for each of the items that appear in the runtime system. In one embodiment, there are rich media files for buttons in the Toolbar 120 (FIG. 4), buttons in the Navigation Bar 125 (FIG. 4), special dialogs in the system, and the items that appear in the Navigation Handler 130 (FIG. 4). As part of the artwork, these rich media files may contain ActionScript or other interpreted instruction sets that controls their animation, appearance, and behavior. For example, the buttons described in FIG. 7 contain ActionScript to communicate with the toolbar 120 and navigation bar 125.

Figure 6:
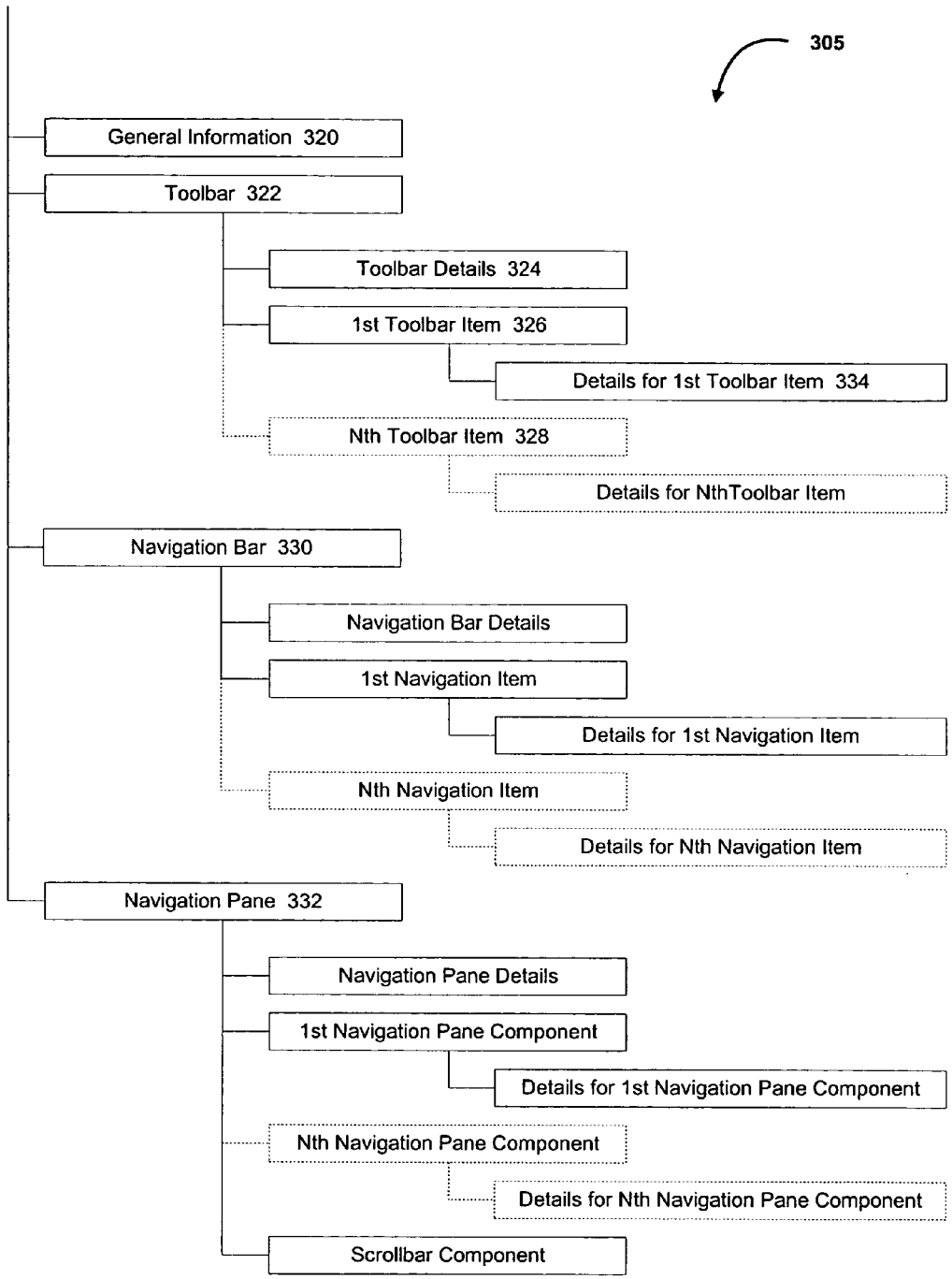
FIG. 6 is a block diagram illustrating an example Skin Data File Structure according to an embodiment of the invention.

FIG. 6 is a block diagram illustrating an example Skin Data File Structure 305 according to an embodiment of the invention. The Skin Data File 305 contains detailed information that defines what the runtime system will look like. It is used in conjunction with the rich media files that contain the basic artwork to be used in the system. In the current embodiment, the skin file 305 normally is different for each runtime system created by the authoring tool because it is specific to the appearance of each particular runtime system.

The Skin Data File 305 is divided into sections for each of the major areas of the exemplary runtime system: Toolbar 322, Navigation Bar 330, and Navigation Pane 332. In addition, there is a general information section at the top of the file 320.

Each section for an area is further divided into subsections containing general information about the section and information about each of the items or components of the area. For example, there is a subsection 326 and 328 for each button in the toolbar section 322.

Each subsection for an item or component is further divided into tags, in the illustrated embodiment, holding the information about the item or component 334. The information in these lowest level tags may include, but is not restricted to: (1) the items that appear in the runtime system; (2) the location of the items in the runtime system; (3) the default text to appear on the items in the runtime system; (4) the timing and speed parameters associated with the appearance of items in the runtime system; and (5) the names of the rich media files containing the artwork for the items.

In one embodiment, the skin data file is an XML file. However, it should be understood that the teachings of the invention are not limited to this exemplary embodiment, and may be applied to, for example, a text or HTML file.

Figure 7:
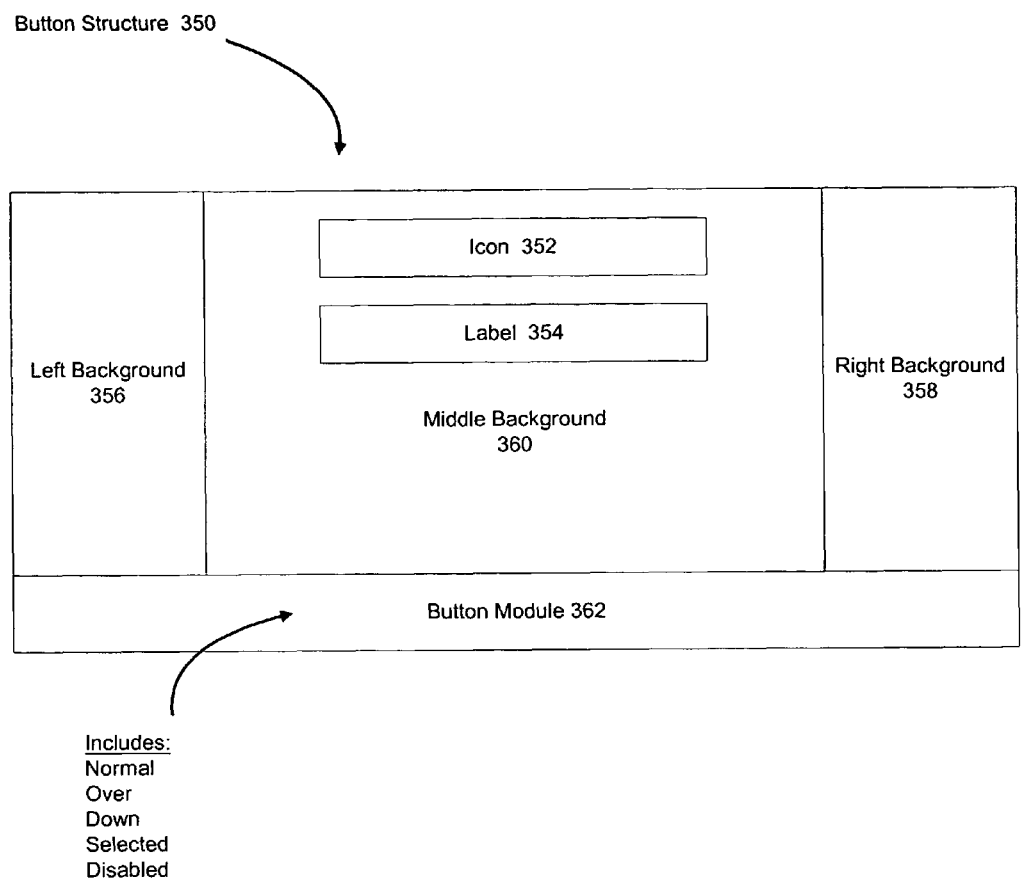
FIG. 7 is a block diagram illustrating an example Button Structure according to an embodiment of the invention.

FIG. 7 is a block diagram illustrating an example Button Structure according to an embodiment of the invention. In the illustrated embodiment, one example of how presentation layer components are constructed is shown. This figure is presented as an example construction of a rich media file containing the artwork for items used by the graphical user interface. It is not meant to represent the only way items or buttons are constructed, but reflects the type of requirements generally required for artwork files in the structured information system.

The background of a button may be constructed in three parts: The left background 356, the middle background 360, and the right background 358. The left background 356 and right background 358 are never stretched in the runtime system in order to maintain the integrity of the edges of the artwork.

Figure 13:
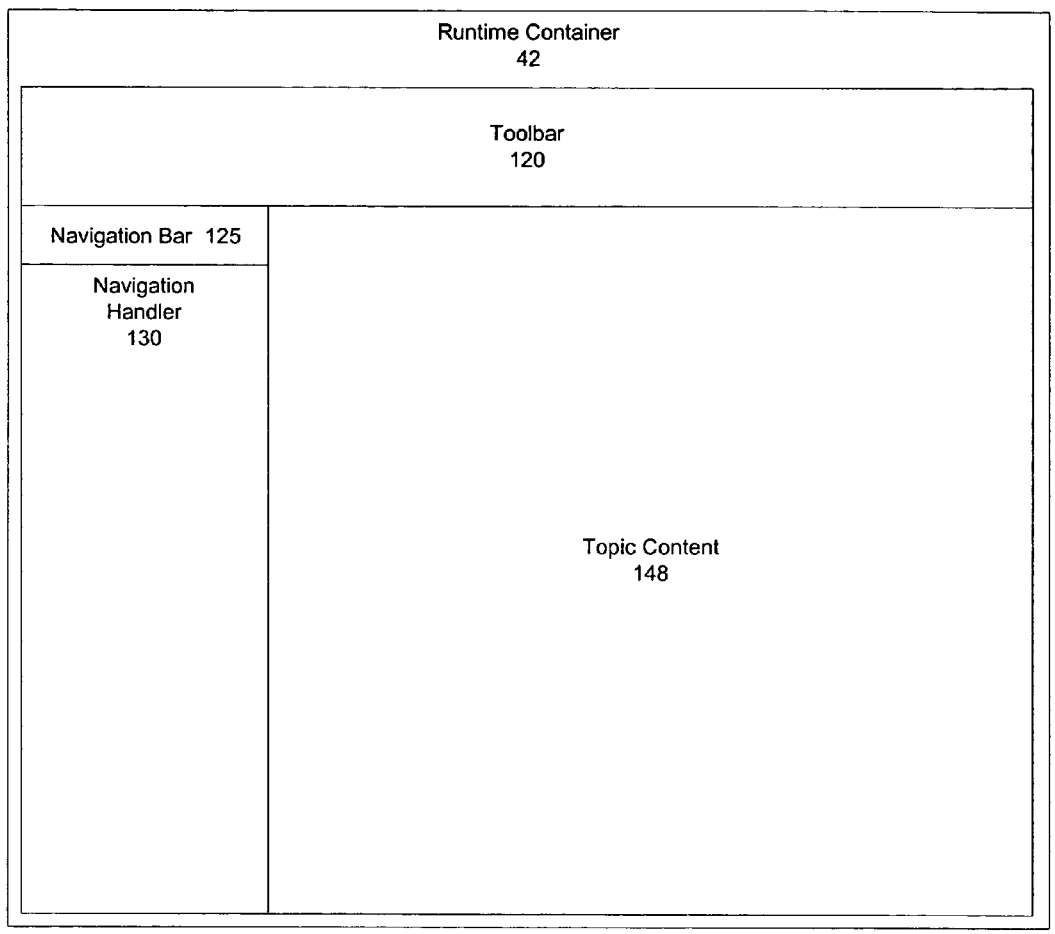
FIG. 13 is a block diagram illustrating an example runtime system for a structured information system according to an embodiment of the invention.

The middle background 360 generally contains the label 354 for the button. By having a placeholder for a label 354 on a button, the button can be used as the artwork for multiple items in the runtime system. For example, the same button artwork file could be used for the Contents, Index, Search, and Glossary buttons in the Toolbar 120 (FIG. 13). At runtime, the information from the Skin Data File 305 (FIG. 5) and Localization Data File 307 (FIG. 5) is used to set the label on the buttons. Because the length of the label 354 changes based on the text contained in the Skin Data 305 (FIG. 5) and Localization files 307 (FIG. 5), the middle background 360 is stretched or shrunk to accommodate the label size.

There is an optional icon 352 for the button that may appear over any of the three segments of the background.

There is a button module 362 that handles the behavior of the button in the runtime system. The button module 362 is responsible for handling mouse movements over the button, invoking different aspects of the artwork for the button in response to the mouse activity, and communicating information with the container of the button in the runtime system. In one embodiment, the button module 362 is stored in a shared runtime rich media file. In an embodiment implemented in Flash, the button module 362 can be implemented as an ActionScript.

The behavior of a button in the runtime system is determined by the button module 362, which can be linked to the shared button structure 350 so it may be implemented in one rich media file. Not only does this allow buttons within a given structured information system to share behavior, but the behavior can be shared and updated across structured information systems. Similarly, the behavior of other aspects of the system (beyond buttons) can be stored in shared runtime rich media files.

In one embodiment, the rich media file for the button contains information about the appearance (state) of the button in the following cases: (1) when no mouse activity is involved with the button and the button is in its normal (enabled) state; (2) when the mouse is moved over the button; (3) when the mouse is pressed on the button; (4) when the button is displayed in its 'selected' state representing that the navigation component invoked by the button is the currently active navigation component; and (5) when the button is disabled because it is not a valid selection for the current context of the runtime system.

Figure 8:
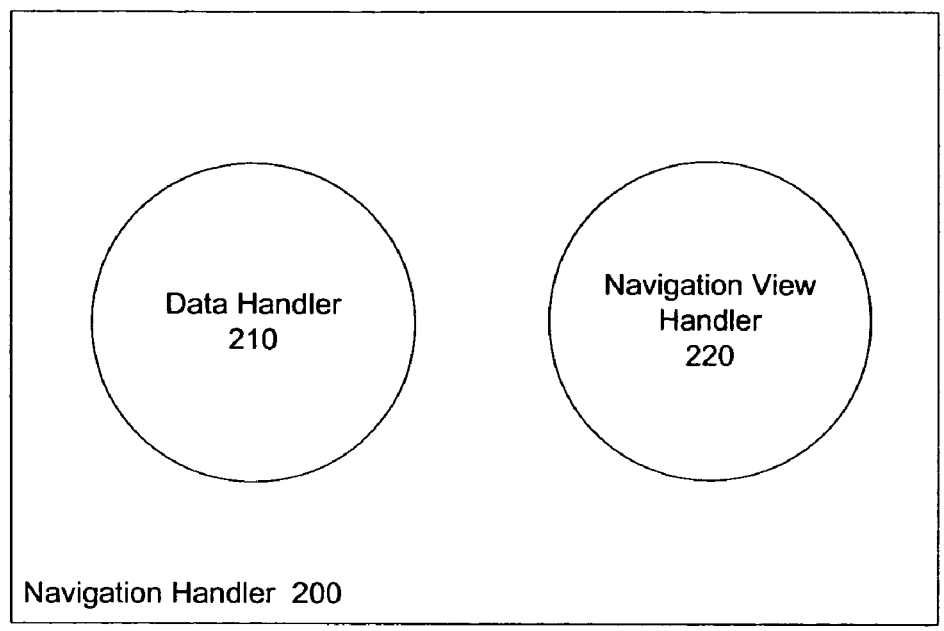
FIG. 8 is a block diagram illustrating an example Navigation Handler according to an embodiment of the invention.

FIG. 8 is a block diagram illustrating an example Navigation Handler 200 according to an embodiment of the invention. In the illustrated embodiment, the Navigation Handler 200 comprises the Data Handler 210 and the Navigation View Handler 220. The Navigation Handler 200 combines the data retrieved by the Data Handler 210 with the graphical display information retrieved from the Navigation View Handler 220 along with information retrieved via the Skin Handler 300 (FIG. 4), to render the various navigation components to the graphical user interface of the runtime system.

Figure 9:
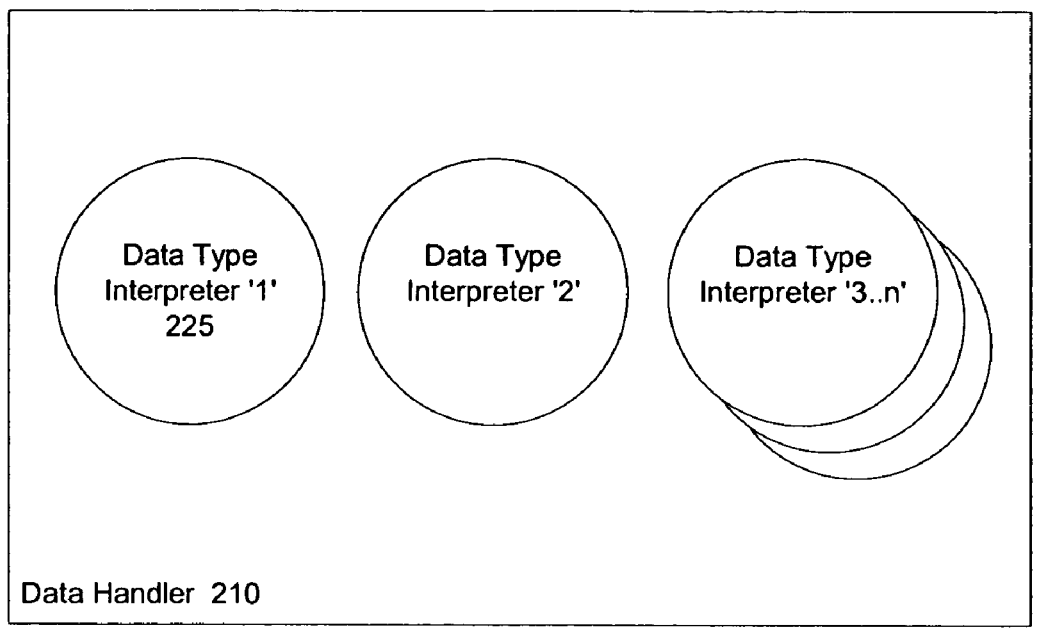
FIG. 9 is a block diagram illustrating an example Data Handler according to an embodiment of the invention.

The Data Handler 210 is comprised of a set of modules that are responsible for loading and manipulating each of the structured information navigation files. These modules are called Data Type Interpreters 225 (FIG. 9). In one embodiment, the Data Handler 210 responds to requests from the Navigation Handler 200 to retrieve data for a particular navigation component. The Data Handler 210 then passes this request along to a Data Type Interpreter 225 (FIG. 9), which is specifically designed to load and manipulate the data specific to the requested navigation component.

Figure 10:
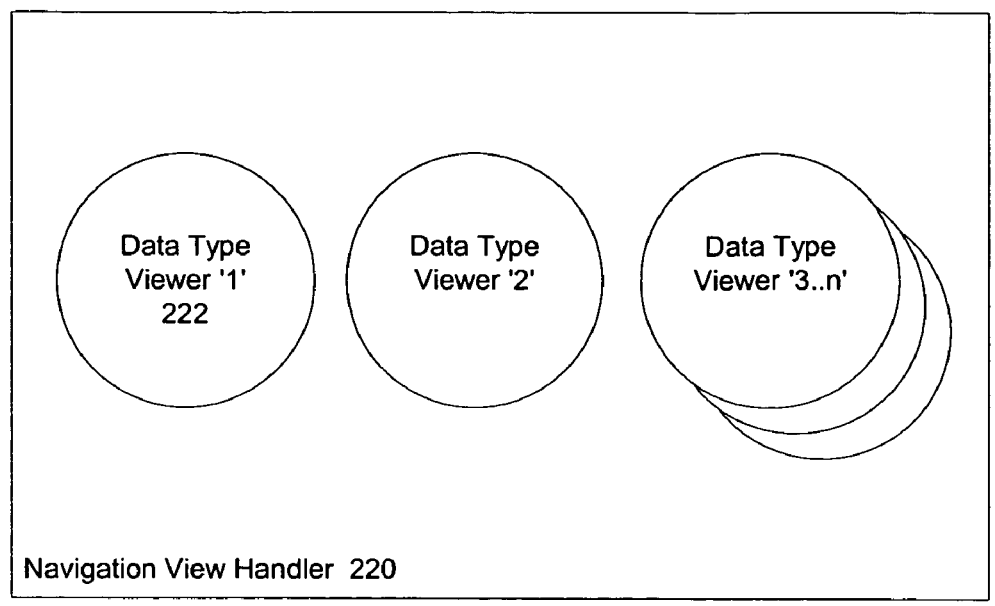
FIG. 10 is a block diagram illustrating an example Navigation View Handler according to an embodiment of the invention.

The Navigation View Handler 220 is comprised of a set of modules that are responsible for displaying the visual manifestations of the navigation information in the runtime system. These modules are called Data Type Viewers 222 (FIG. 10). In one embodiment, in a similar manner to the Data Handler 210, the Navigation View Handler 220 responds to requests from the Navigation Handler 200 to graphically display a particular navigation component. The Navigation View Handler 220 then passes this request along to a Data Type Viewer 222 (FIG. 10), which is specifically designed to display the particular navigation paradigm in the runtime system. The communication mechanism between the Data Handler components and Navigation Handler components is similar to the communication mechanisms described elsewhere.

FIG. 9 is a block diagram illustrating an example Data Handler 210 according to an embodiment of the invention. The Data Handler 210 is comprised of a set of modules that are responsible for loading and manipulating each of the structured information navigation files. These modules are called Data Type Interpreters 225. These modules also respond to requests from the Data Type Viewers 222 (FIG. 10) to perform actions on the data and return information to the Data Type Viewers 222 (FIG. 10). In one embodiment, the Data Type Interpreters and Data Type Viewers use a message passing request/response mechanism to communicate information between them. Alternatively, the Data Type Interpreters and Data Type Viewers can use simple function call mechanisms to communicate information. Although the Data Type Interpreters and Data Type Viewers are constructed independently, because they communicate information contained in the data files, Data Type Interpreters and the Data Type Viewers they communicate with share knowledge about the structure of that information.

In one embodiment, there may be four discrete Data Type Interpreters 225. One for each of the following: Table of Contents (TOC), Index, Search, and the Glossary. In various embodiments, the Search may be a full text search or a natural language search. Other types of searches may also be implemented.

FIG. 10 is a block diagram illustrating an example Navigation View Handler 220 according to an embodiment of the invention. The Navigation View Handler 220 is comprised of a set of modules that are responsible for displaying the visual presentation of the navigation information in the runtime system. These modules are called Data Type Viewers 222. Each Data Type Viewer 222 is responsible for the visual presentation of data returned from one or more Data Type Interpreters 225 (FIG. 9) described earlier. Because each Data Type Viewer is generally responsible for displaying one type of data, Data Type Viewers are unique. There may be multiple data type viewers displaying the same data using different graphical representations. In one embodiment, for example, one Data Type Viewer displays a hierarchical tree structure of information representing a table of contents in a structured information system. Another Data Type Viewer takes input from the user of a structured information system, performs a full-text search query on the data set, and returns the results as a simple list of topics. Even though the display aspects of each Data Type Viewer are unique, they all conform to a standard communication interface that allows them to communicate properly with the Data Type Handler and Data Type Interpreters.

In one embodiment, there may be four Data Type Viewers 222. One for each of the following: Table of Contents (TOC), Index, Search, and the Glossary. Additionally, there may be a Data Type Viewer 222 for displaying browser sequence information, although data from a source other than the Data Type Interpreters 225 (FIG. 9) may also be used.

In one embodiment a one-to-one relationship between the Data Type Interpreters 225 (FIG. 9) and the Data Type Viewers 222 exists. It is important to note that the underlying architecture is designed to support a many-to-many relationship between Data Type Interpreters 225 (FIG. 9) and Data Type Viewers 222. This separation of the underlying data from the visual presentation of that data allows one or more sets of data (i.e., the information returned from one or more Data Type Interpreters 225—FIG. 9) to be visually presented in the runtime in myriad ways by simply applying a unique Data Type Viewer 222. This is a key aspect in the ability to "skin" the runtime system (i.e., customize the appearance). The ability to apply multiple Data Type Viewers 222 to a single or multiple Data Type Interpreters 225 (FIG. 9) allows the author to change the graphical presentation of the runtime system without changing the underlying functionality of the various navigation components and more generally the runtime system.

Figure 11:
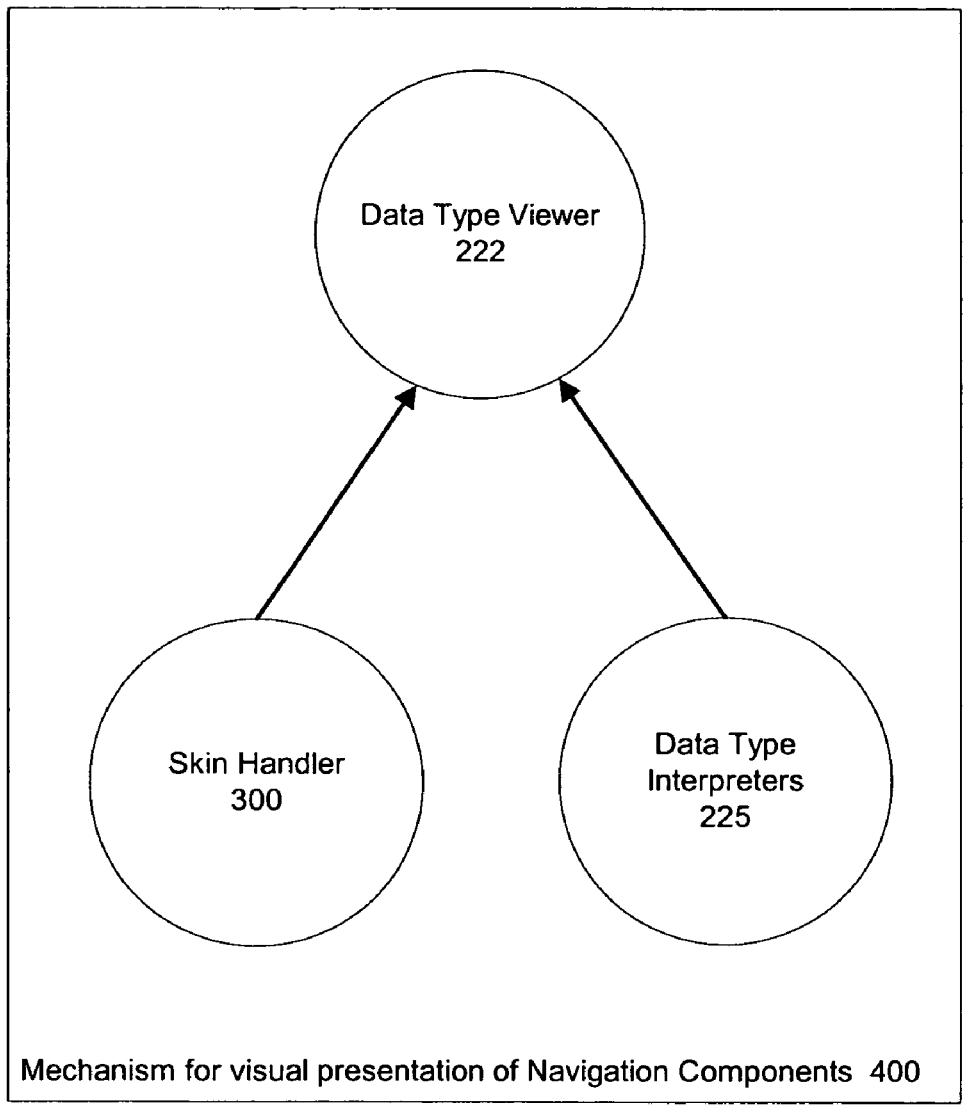
FIG. 11 is a block diagram illustrating an example flow of information for visual presentation of navigation components according to an embodiment of the invention.

FIG. 11 is a block diagram illustrating an example flow of information for visual presentation of navigation components according to an embodiment of the invention. In the illustrated embodiment, a Data Type Viewer 222 receives data from one or more Data Type Interpreters 225. The Data Type Viewer 222 structures the data for presentation and displays the data using the presentation data passed to it by the Skin Handler 300. A Data Type Viewer 222 is responsible for defining the underlying architecture of a navigation component. It defines the framework for a set of subcomponents that need to be provided to render a specific navigation paradigm. The Skin Handler 300 is responsible for defining the specific subcomponents that will be used in the framework defined by the Data Type Viewer 222, to render the navigation component in the runtime system.

Figure 12:
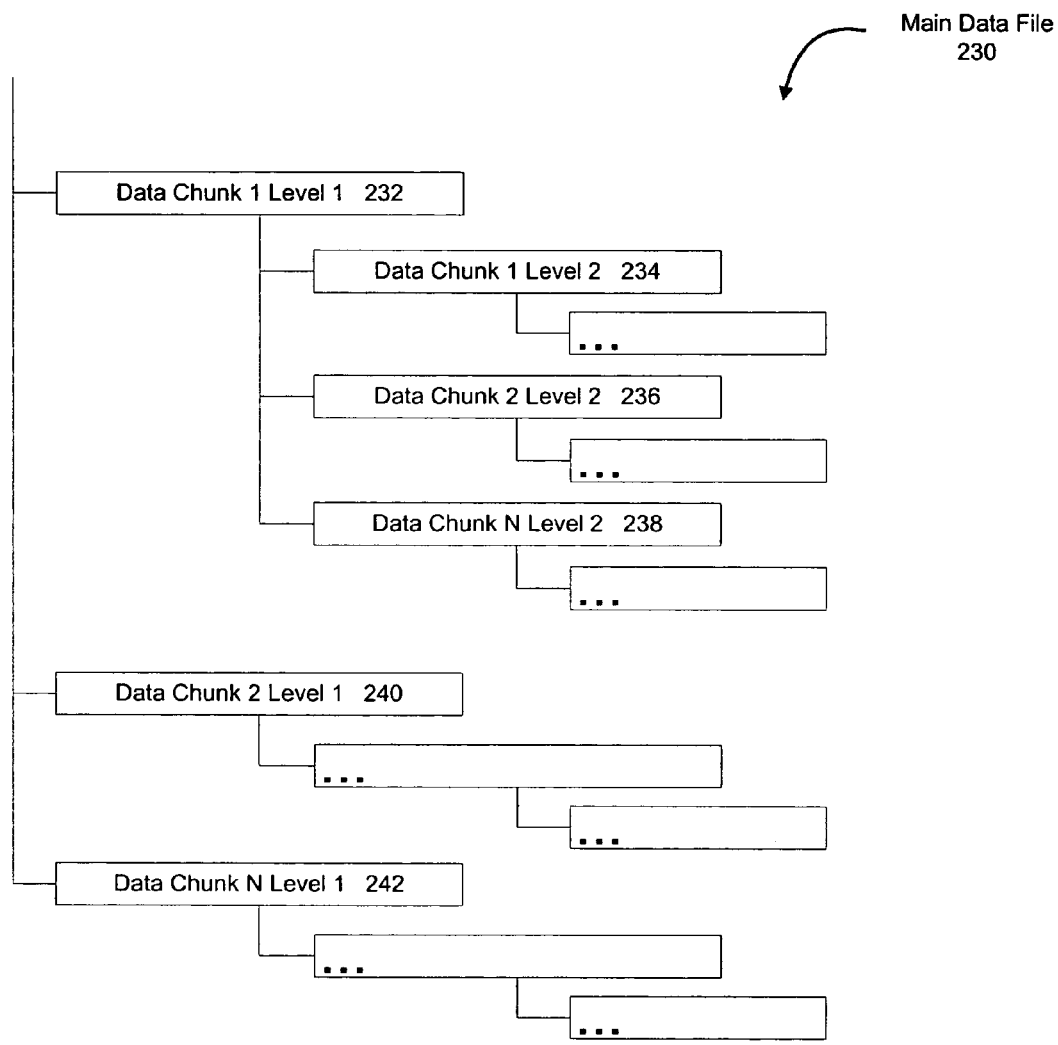
FIG. 12 is a block diagram illustrating an example Data File Structure for Navigation Components according to an embodiment of the invention.

FIG. 12 is a block diagram illustrating an example Data File Structure 230 for Navigation Components according to an embodiment of the invention. In the illustrated embodiment, each navigation component (represented by the TOC, Index, Search, and Glossary) uses navigation information from a set of data files. This data is read in by one or more Data Type Interpreters 225 (FIG. 9).

Depending on the size of the files and the anticipated connection bandwidth of end users viewing the runtime system, the files are divided into multiple pieces in order to optimize the download time and speed of the system.

Each set of navigation data files has one main data file 230 that is the main access point of information for the Data Type Interpreters 225 (FIG. 9). The main data file 230 contains information that tells the Data Type Interpreters 225 which other data files exist and the information they contain.

The main data file 230 contains pointers to the first level of data divided into multiple files 232, 240, and 242. In a hierarchical fashion, each first level data file 232, 240, and 242 may be further divided into multiple data files depending on the size of the files and the anticipated connection bandwidth of end users. For example, the first data chunk at the first level 232 is shown in the figure as further divided into additional data files (or 'chunks') 234, 236, and 238.

Furthermore, the second level data files 234, 236, and 238 may be subsequently divided into third level data files and so on as necessary to accomplish the download requirements of the system.

FIG. 13 is a block diagram illustrating an example runtime system for a structured information system according to an embodiment of the invention. In one embodiment, each of the major areas (Toolbar 120, Navigation Bar 125, Navigation Handler 130, and Topic Content 148) comprises a mixture of HTML and rich media files. In the following paragraphs, each of the major areas of the runtime system will be described. It should be noted that the teachings of the invention are not limited to the layout shown in FIG. 13. Each of the major areas 120, 125, 130, and 148 can be located in any position and in any relation to each other. For example, the areas could be stacked vertically, one on top of the other. There may also be more or fewer major areas in the runtime system.

The Toolbar Area 120 contains buttons used by the user of the runtime system to invoke the different Navigation components (e.g. TOC, Index, Search, Glossary, etc.) through the Navigation Handler 130 or invoke special actions in the runtime system, such as printing the current Topic 148. It should be noted that the items in the Toolbar 120 are not limited to this functionality, and in fact, could be used for a variety of purposes in the runtime system.

In one embodiment, the Toolbar 120 comprises a Contents button used to invoke the table of contents navigation component, an Index button used to invoke the index navigation component, a Glossary button used to invoke the glossary navigation component, a Search field used to accept input of a search string that is passed to the search navigation component, a Print button used to print information from the runtime system including topic content, navigation information, and general information about the system, and a Powered By button used to display general information about the runtime system.

The Navigation Bar Area 125 contains buttons used by the user of the runtime system to navigate the runtime system and to control the behavior of the navigational components area of the runtime system.

In one embodiment, the Navigation Bar 125 comprises one or more Browse buttons used to navigate through sequences of related information in the runtime system, a Synchronize TOC button used to select the item in the table of contents corresponding to the current topic being displayed in the runtime system, and a Hide navigation button used to hide the navigation components in the runtime system to provide more space for the display of topic information.

The Navigation Handler Area 130 hosts the various navigation components. In the current embodiment, these are the: Table of Contents (TOC), Index, Full Text Search, and Glossary.

The Topic Contents Area 148 is responsible for displaying the structured navigation system topic content. The information in this area is dynamically changed in response to end user manipulation of the navigation components. The information (Topic) in this area can also be changed through mechanisms contained without the topic content itself, such as links to other topics.

In one embodiment, the content is HTML, but it should be understood that the content can be in any form including plain text, JavaScript, Flash, still images, audio, video, and any combination of these and other forms of content.

The last major area of the runtime system is the Runtime Container 42. The runtime container 42 is responsible for hosting the runtime system of the structured navigation system. In one embodiment, the runtime container 42 can be a standard Web browser. However, it should be understood that the runtime container 42 can be anything that supports the display of HTML and/or interactive multimedia content, such as a movie.

In HTML and rich media based structured information systems such as those described herein, there is sometimes a need to display rich media content in a dynamically-sized HTML window. In one embodiment, for example, a "related topics" control in a topic results in a list of topic titles for topics that are related to the one currently being viewed. Because the size of the list of related topics varies based on the topic being viewed, the rich media content containing the list varies in size. The current invention contains a mechanism for the rich media content to be created dynamically, then the size of the rich media content is communicated to the encapsulating HTML construct, and the HTML construct resizes itself to properly contain the rich media content, for example an interactive multimedia movie.

An exemplary embodiment will now be described to illustrate how all of the components of the system work together. In the exemplary embodiment, a simplified help system that follows the layout described in FIG. 13 is used. The example Help system contains a Toolbar 120 that contains one button 350 (FIG. 7) for invoking the Table Of Contents (TOC) navigation component, which is hosted by the Navigation Handler 130.

In this example, the communication flow and the interactions of the various components of the runtime system when a user presses the TOC button will be described. Additionally, the communication flow and the interactions of the various components of the runtime system when a user selects a topic in the table of contents for display in the Topic Content Area 148 will be described. For simplicity, this example will only focus on the communications which take place within the runtime system. The majority of communications between the User Device 10 (FIG. 1) and the runtime system will not be described.

As the user moves an input device (e.g., mouse pointer) over the button 350 (FIG. 7), the button 350 (FIG. 7) receives a command from the User Device 10 (FIG. 1) that the mouse is over the button 350 (FIG. 7). When this occurs, the button updates its state 362 (FIG. 7) to the Over state. This state change results in the button changing its display characteristics based on information it received from the Skin Handler 300 (FIG. 4) when the runtime system was initially loaded.

The user now clicks on the button 350 (FIG. 7). This action results in two events: The first is a button 350 (FIG. 7) state change 362 to the Down State. This is similar to that described above for the state change to the Over state. The visual display may be different for this state, but the mechanism is the same. The second event is a message sent from the button, to the Toolbar Area Manager 120. The Toolbar Area Manager 120 then sends a message to the Communication Handler 100 (FIG. 4). Inside the Communication Handler 100 (FIG. 4) the message is translated and routed (FIG. 3) to the Navigation Handler 130. The message sent to the Navigation Handler, is a request to display the TOC navigation component.

The Navigation Handler 130 then communicates with the appropriate Data Handler(s) 210 (FIG. 8) and Navigation View Handler(s) 220 (FIG. 8) along with the Skin Handler 300 (FIG. 4) to build and display the TOC navigation component.

Next, the user clicks on an item from the TOC navigation component. This results in two events. The first is a state change event for the TOC navigation component. The result of the state change is to modify the visual appearance of the item chosen by the user to indicate that the item has been selected. The characteristics for the visual display of this state follow a similar mechanism to the state change described for the button 350 (FIG. 7) above.

The second event results in a message being sent from the TOC navigation component to the Navigation Handler 130. From here, a message is sent to the Communication Handler 100, which translates and routes the message. In this case, the message is routed to the Runtime container 42, which has the responsibility for loading the appropriate structured information system content 145 (FIG. 4) into the Topic Content Area 148.

Figure 14:
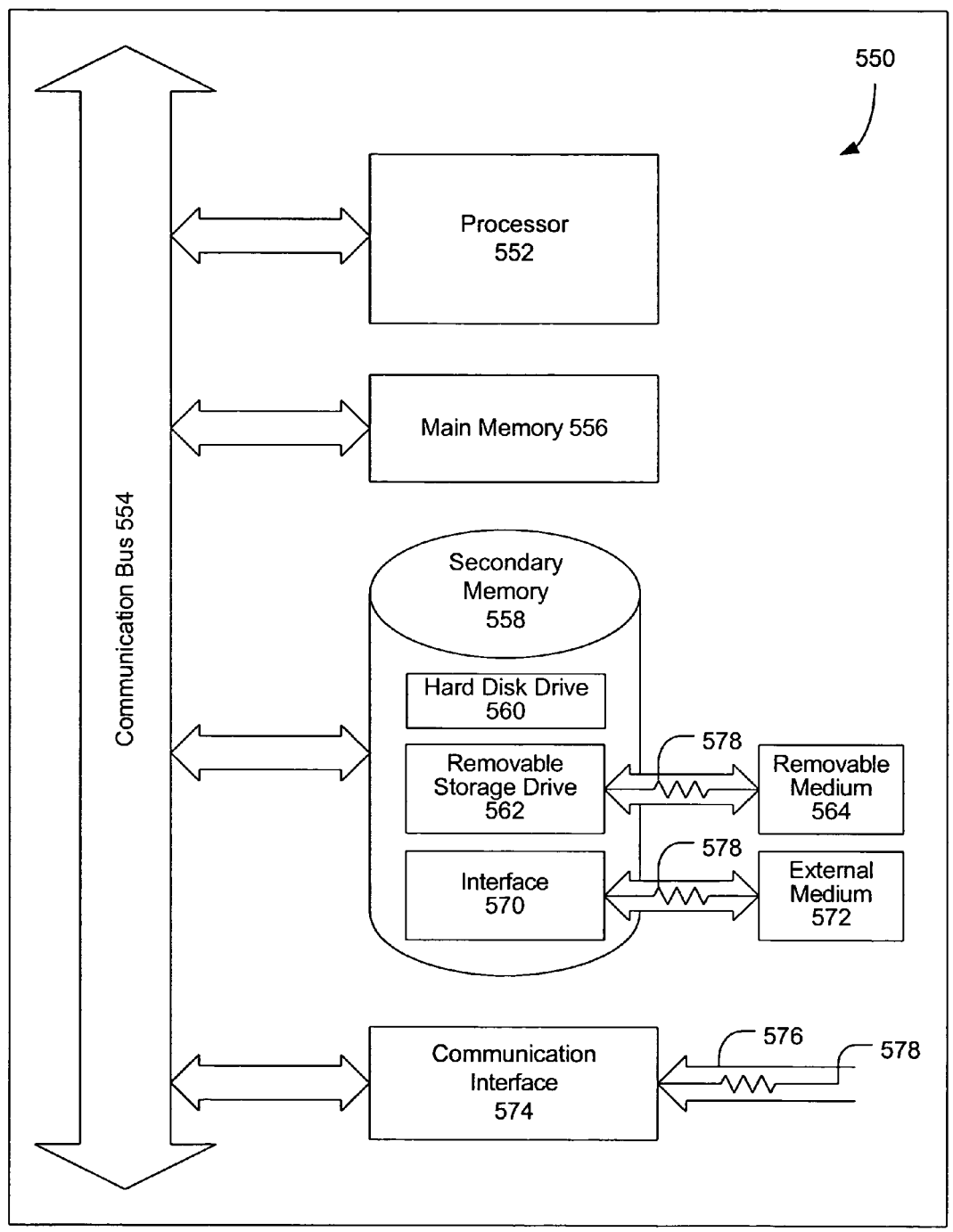
FIG. 14 is a block diagram illustrating an exemplary computer system that may be used in connection with the various embodiments described herein.

FIG. 14 is a block diagram illustrating an exemplary computer system 550 that may be used in connection with the various embodiments described herein. For example, the computer system 550 may be used in conjunction with a user device that runs a structured information system such as an application specific help system. In alternative embodiments, the computer system 550 may be a personal digital assistant ("PDA"), laptop, personal computer ("PC"), wireless communication device (e.g., providing remote audio, video, and text services), or any other computing device with the need to provide structured information to a user. Other computer systems and/or architectures may also be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPM"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or Flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, an IEEE 1394 fire-wire, and a wireless radio, just to name a few.

Communication interface 574 preferably implements industry promulgated protocol standards, such as Ethernet IEEE 802 standards (including 802.3 wired and 802.11 wireless) Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of communication means including wire or cable, fiber optics, conventional phone line, cellular phone link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

While the particular system and method herein shown and described in detail is fully capable of attaining the above described objects of this invention, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A system for providing structured information, comprising:
   a data storage device storing data for a data storage area comprising one or more data files and content for a structured information system for a network-based application,
      wherein the structured information system has an organizational structure for the content, and
      wherein the structured information system comprises one or more navigation components which enable access to the content according to the organizational structure;
   a computer readable medium storing program instructions executable to implement:
      a runtime container configured to display a plurality of discrete areas,
         wherein the one or more data files describe or modify a composition of one or more of the plurality of discrete areas, and
         wherein the runtime container is a browser;
      a multimedia application environment configured to support animation, video and interactive content,
         wherein the multimedia application environment is further configured to execute one or more interactive multimedia files to implement the structured information system within the runtime container,
         wherein the structured information system is compatible across a plurality of different types of browsers and a plurality of different types of platforms, and
         wherein the structured information system comprises:
            a communication handler configured to communicate with the runtime container,
               wherein the communication handler is implemented by the one or more interactive multimedia files; and
            a navigation handler configured to display a plurality of elements of one of the one or more navigation components in one of the plurality of discrete areas in response to communications received from the communication handler indicating selection of the one of the one or more navigation components through a user interface in another one of the plurality of discrete areas, wherein an appearance of the one or more of the navigation components is controlled by one or more of the one or more data files, wherein the appearance of the one or more of the navigation components remains consistent when displayed on each of the plurality of different types of browsers and each of the plurality of different types of platforms, wherein selection of any one of the plurality of elements of the selected one of the one or more navigation components invokes display of a corresponding portion of the content in yet another one of the plurality of discrete areas of the runtime container, and wherein the navigation handler is implemented by the one or more interactive multimedia files.

2. The system of claim 1, wherein the navigation handler is further configured to provide instructions to the runtime container, the instructions comprising instructions to control the plurality of discrete areas;

wherein the structured information system further comprises a skin handler configured to retrieve graphical user interface data from the data storage area and provide the graphical user interface data to the runtime container;

wherein the communication handler is configured to route communications between the runtime container, the navigation handler, and the skin handler.

3. The system of claim 2, wherein the communication handler further comprises a translator configured to parse communications into discrete instructions.

4. The system of claim 2, wherein the navigation handler comprises a plurality of area managers, wherein each one of the plurality of area managers is configured to control a respective one of the plurality of discrete areas of the runtime container.

5. The system of claim 4, wherein the navigation handler modifies the location of the plurality of discrete areas during execution of the structured information system.

6. The system of claim 4, wherein one of the plurality of area managers modifies the visual appearance of one of the plurality of discrete areas during execution of the structured information system.

7. The system of claim 4, wherein the skin handler provides graphical user interface data to the plurality of area managers.

8. The system of claim 1, wherein the one or more navigation components comprise at least one of a table of contents, a glossary, an index or a search utility.

9. The system of claim 1, wherein each of the plurality of discrete areas is at least partially defined by an HTML page; and wherein a hidden HTML frame is dynamically reloaded to transmit information from the HTML page of the runtime container to the communication handler of the multimedia application environment.

10. The system of claim 4, wherein each one of the plurality of area managers has a respective unique identifier, and wherein the communication handler is configured to communicate with each of the plurality of area managers for its respective discrete area via a respective local connection, the local connection having a unique name comprising the unique identifier for that area manager.

11. The system of claim 10, wherein the unique identifier is derived from the time at which the structured information system is initialized.

12. The system of claim 1, wherein one of the plurality of discrete areas comprises a curved scrollbar implemented by one of the one or more interactive multimedia files.

13. The system of claim 1, wherein the communication handler is further configured to store state information for the plurality of discrete areas.

14. The system of claim 1, wherein the plurality of discrete areas provide a graphical user interface for navigating and viewing the structured information system content, wherein the graphical user interface is dynamically updated at runtime based on a user selection.

15. The system of claim 14, wherein the graphical user interface is dynamically updated at runtime based on a system state.

16. The system of claim 1, wherein the structured information system is an application help system.

17. A method for providing an application help system, comprising:

a data storage device storing data for a data storage area comprising one or more data files and content for the application help system for a network-based application, wherein the application help system has an organizational structure for the content, and wherein the application help system comprises one or more navigation components which enable access to the content according to the organizational structure;

a runtime container displaying a plurality of discrete areas, wherein the runtime container is a browser;

a multimedia application environment configured to support animation, video and interactive content, wherein the multimedia application environment is further configured to execute one or more interactive multimedia files to implement the application help system within the runtime container, wherein the application help system is compatible across a plurality of different types of browsers and a plurality of different types of platforms, and wherein said implementing the application help system comprises:

executing the one or more interactive multimedia files, wherein each one of a plurality of area managers is implemented by a different one of the one or more interactive multimedia files, wherein each one of the plurality of area managers controls a respective one of the plurality of discrete areas, wherein each one of the plurality of area managers accesses the one or more data files associated with the respective one of the plurality of discrete areas, and wherein each one of the one or more data files describes or modifies a composition of the respective one of the plurality of discrete areas;

receiving user input indicating selection of one of the one or more navigation components for the application help information through a user interface in one of the plurality of discrete areas, wherein an appearance of the one or more of the navigation components remains consistent when displayed on each of the plurality of different types of browsers and each of the plurality of different types of platforms;

in response to said receiving user input, one of the plurality of area managers displaying a plurality of elements of the selected navigation component for the application help information in another one of the plurality of discrete areas;

receiving additional user input indicating selection of one of the plurality of elements of the navigation component for the application help information; and in response to said receiving the additional user input:
   retrieving the application help information from a data storage area, wherein the application help information corresponds to the additional user input; and
   invoking display of the application help information in yet another one of the plurality of discrete areas.

18. The method of claim 17, wherein the retrieving further comprises:

creating a plurality of frames, wherein each frame comprises a subset of the operations required to retrieve the application help information from the data storage area; and providing feedback to the multimedia application environment at the end of each frame to prevent the multimedia application environment from timing out the application help information retrieval.

19. The method of claim 18, wherein the one or more navigation components comprise at least one of a table of contents, a glossary, an index or a search utility.

20. The method of claim 17, further comprising:

receiving a request for a variable length list of items to be displayed in one of the plurality of discrete areas;

creating an object comprising the variable length list of items;

querying the object to determine its length; and sizing the one of the plurality of discrete areas to accommodate the object.

* * * * *